(12) United States Patent
Budde et al.

(10) Patent No.: US 11,728,626 B2
(45) Date of Patent: Aug. 15, 2023

(54) METHOD FOR MANUFACTURING A PRECHAMBER SPARK PLUG

(71) Applicant: Robert Bosch GmbH, Stuttgart (DE)

(72) Inventors: Matthias Budde, Asperg (DE); Matthias Blankmeister, Heiligenhaus (DE); Philipp Rottmann, Bischberg (DE); Stephan Kaske, Sternenfels Diefenbach (DE); Ugur Yilmaz, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/769,513

(22) PCT Filed: Sep. 28, 2020

(86) PCT No.: PCT/EP2020/077067
§ 371 (c)(1),
(2) Date: Apr. 15, 2022

(87) PCT Pub. No.: WO2021/099016
PCT Pub. Date: May 27, 2021

(65) Prior Publication Data
US 2022/0376480 A1    Nov. 24, 2022

(30) Foreign Application Priority Data
Nov. 19, 2019   (DE) .................. 10 2019 217 833.2

(51) Int. Cl.
*H01T 13/54*    (2006.01)
*H01T 21/02*    (2006.01)
*H01T 13/08*    (2006.01)

(52) U.S. Cl.
CPC ............. *H01T 21/02* (2013.01); *H01T 13/08* (2013.01); *H01T 13/54* (2013.01)

(58) Field of Classification Search
CPC .......... H01T 13/08; H01T 13/54; H01T 21/02
(Continued)

(56) References Cited

U.S. PATENT DOCUMENTS

2008/0196689 A1    8/2008  Gagliano et al.
2018/0294624 A1*  10/2018  Niessner .................. H01T 21/02

FOREIGN PATENT DOCUMENTS

DE    202008015598 U1    2/2009
DE    102018101680 A1    7/2018
(Continued)

OTHER PUBLICATIONS

International Search Report for PCT/EP2020/077067, dated Dec. 17, 2020.

*Primary Examiner* — Christopher M Raabe
(74) *Attorney, Agent, or Firm* — Norton Rose Fulbright US LLP; Gerard Messina

(57) ABSTRACT

A method for manufacturing a prechamber spark plug including an external thread and a cap including at least one through-opening. The method includes: providing the prechamber spark plug without a cap and including a cylindrical circumferential surface for the external thread. Mounting the cap, which includes at least one through-opening, in an arbitrary alignment at the prechamber spark plug, and creating the external thread at the circumferential surface in such a way that a thread start and/or a thread end of the external thread is aligned in relation to the through-opening at a predetermined position.

8 Claims, 3 Drawing Sheets

(58) Field of Classification Search
USPC .............................................................. 445/7
See application file for complete search history.

(56) References Cited

FOREIGN PATENT DOCUMENTS

DE 102017107728 A1 10/2018
EP 2525452 A1 11/2012

* cited by examiner

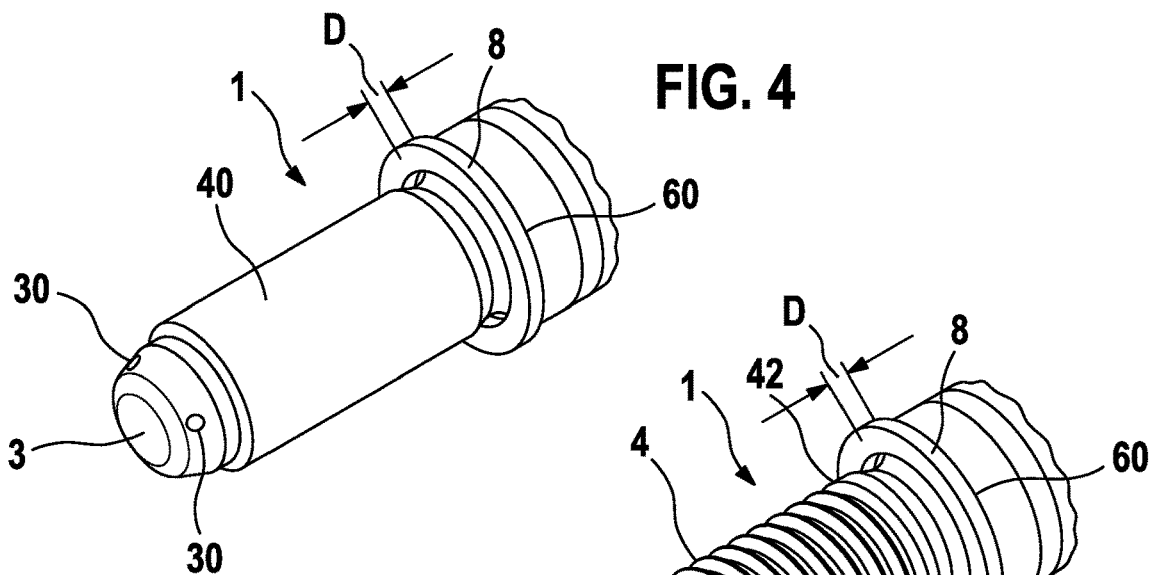
FIG. 4
FIG. 5
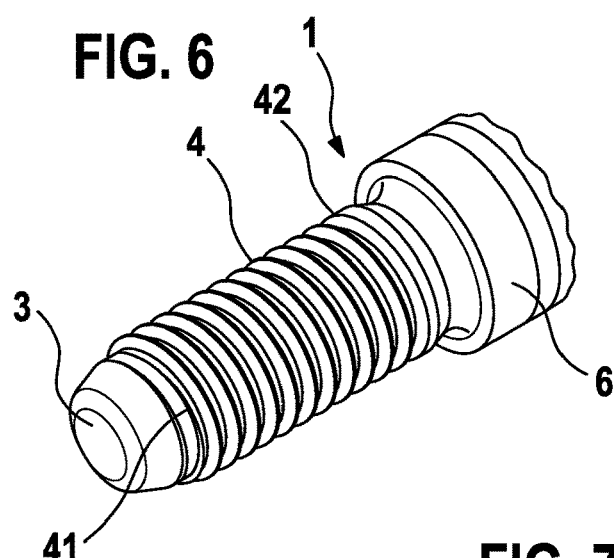
FIG. 6
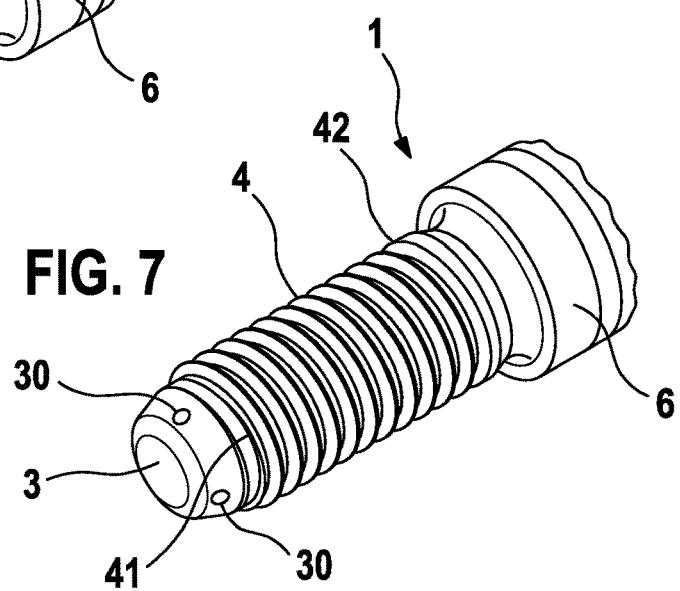
FIG. 7

METHOD FOR MANUFACTURING A PRECHAMBER SPARK PLUG

FIELD

The present invention relates to a method for manufacturing a prechamber spark plug.

BACKGROUND INFORMATION

Prechamber spark plugs are available in the related art in various embodiments. A prechamber of the prechamber spark plug is usually defined with respect to a combustion chamber of an internal combustion engine with the aid of a cap. Through-holes are provided in the cap so that torch jets may find their way through the through-holes into the combustion chamber of the internal combustion engine after an ignition in the prechamber, and may ignite a mixture present there. A problematic issue in the case of prechamber spark plugs is due to the fact that each internal combustion engine has different conditions, in particular the location of the prechamber spark plug in relation to an injection jet of a fuel into the combustion chamber, as well as the position of fuel injectors and the position of the prechamber spark plug at the combustion chamber. For this reason, a coordinated positioning of the components of the prechamber spark plug is necessary for each internal combustion engine to enable a reliable ignition and, in the case of a gas exchange cycle, also a sufficient gas exchange within the prechamber. For this purpose, a method was described in German Patent Application No. DE 10 2017 107 728 A1 in which a cap of the prechamber spark plug is placed on and welded in relation to a previously created external thread, with the aid of which the prechamber spark plug is fixed in a cylinder head or the like.

SUMMARY

A method according to the present invention for manufacturing a prechamber spark plug may have an advantage over the related art that a rapid and simple method for manufacturing a prechamber spark plug is possible. In accordance with an example embodiment of the present invention, in the process, an alignment of a cap with at least one through-opening relative to an external thread of the prechamber spark plug, with the aid of which the prechamber spark plug is fixed in a cylinder head or the like, may be made possible in a simple and rapid manner. In this way, a mixture exchange and an exhaust gas exchange may take place optimally within the prechamber, and torch jets may be introduced more rapidly and earlier, as well as deliberately, into a combustion chamber of an internal combustion engine after an ignition in the prechamber of the prechamber spark plug. In the process, the through-opening of the cap is provided in defined positions at a start of a thread and/or an end of a thread of the external thread of the prechamber spark plug. This is achieved according to the present invention in that the method includes the following steps.

First, the prechamber spark plug is provided, without a cap and without an external thread. Thereafter, the cap, which includes at least one through-opening, preferably a plurality of through-openings, is mounted in an arbitrary orientation at the prechamber spark plug. Since no alignment work is required, this process may be carried out particularly easily and rapidly. Thereafter, an external thread is created at the prechamber spark plug in such a way that a start and/or an end of the external thread is aligned in relation to the at least one through-opening of the cap. In this way, a defined relative position is achieved between the start and/or end of the external thread and the through-opening of the cap. In this way, a reliably repeatable mountability of the prechamber spark plug at internal combustion engines may be made possible. In this way, a high level of quality of the mounting of prechamber spark plugs is ensured.

In this way, the external thread may always be optimally created relative to the through-opening of the cap, depending on the application case, for various internal combustion engines. Compared to the related art, the manufacture of the prechamber spark plug is considerably simplified since the cap may be attached to the prechamber spark plug, which does not yet include an external thread, in an arbitrary manner, and thereafter only an alignment step is necessary to create the external thread. For example, the cap may be attached to the prechamber spark plug with the aid of welding or other fixation measures.

Preferred refinements of the present invention are disclosed herein.

The external thread is preferably created with the aid of rolling or cutting. As a result of these two methods for creating the external thread, it is possible to reliably move to a position of a start of a thread and/or an end of a thread and the start of the thread and/or the end of the thread may be exactly positioned.

Particularly preferably, a determination of the position of the start of the thread and/or the end of the thread may be carried out with the aid of optical methods as a function of a position of the through-opening in the cap. The prechamber spark plug itself may then, for example, be rotated about its longitudinal axis in the restraint to then create the external thread having the accordingly positioned start of the thread and/or end of the thread at the predetermined position.

Further preferably, the method additionally includes the step of providing a disk having a predetermined thickness, the disk being situated adjoining the circumferential surface for the external thread of the prechamber spark plug at which the external thread is to be created later on. Particularly preferably, the disk has a constant thickness.

Particularly preferably, a thickness of the disk is determined as a function of a location of the through-openings of the cap. Thereafter, the external thread is then created at the prechamber spark plug. In the process, particularly preferably a standard external thread is provided.

The disk adjoining the external thread is preferably a sealing disk.

Further preferably, a pitch of the external thread is furthermore determined, based on an angle of a through-opening in the cap with respect to a center axis X-X of the prechamber spark plug.

According to one further preferred embodiment of the present invention, the prechamber spark plug includes at least two through-openings and a start and/or an end of the external thread of the prechamber spark plug is/are situated between two through-openings in the circumferential direction. The start of the thread and/or the end of the thread is/are preferably situated in the center between two thread openings.

BRIEF DESCRIPTION OF THE DRAWINGS

Preferred exemplary embodiments of the present invention are described hereafter in greater detail with reference to the figures.

FIG. 4 shows a schematic, perspective partial view of a prechamber spark plug without an external thread.

FIG. 5 shows a schematic, perspective partial view of the prechamber spark plug of FIG. 4, including an external thread.

FIGS. 6 and 7 show schematic, perspective partial views of a prechamber spark plug.

DETAILED DESCRIPTION OF EXAMPLE EMBODIMENTS

Figure 1:
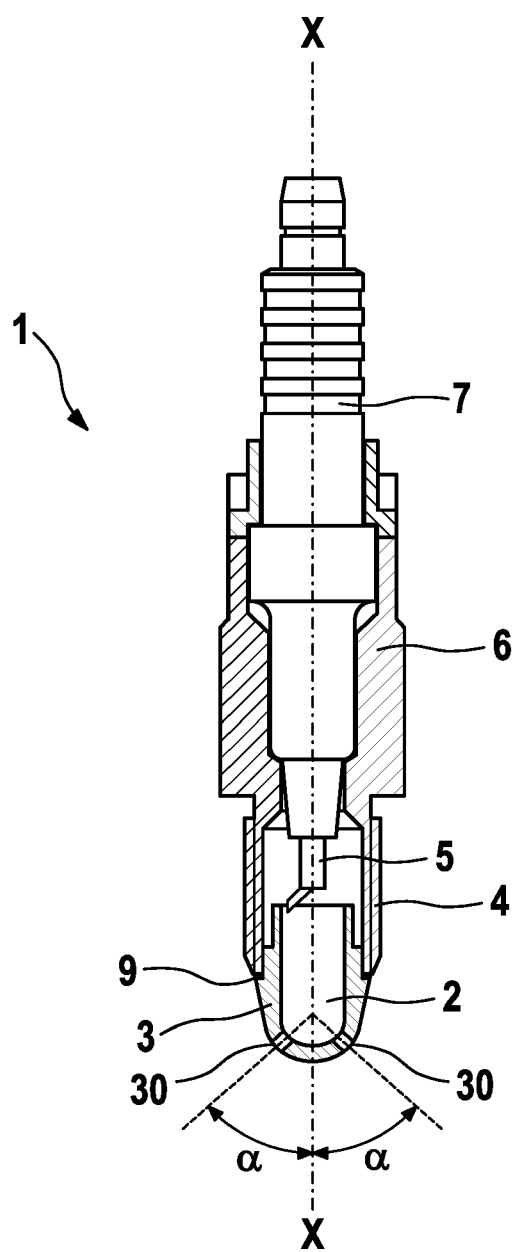
FIG. 1 shows a schematic sectional view of a prechamber spark plug according to one exemplary embodiment of the present invention.
Figure 2:
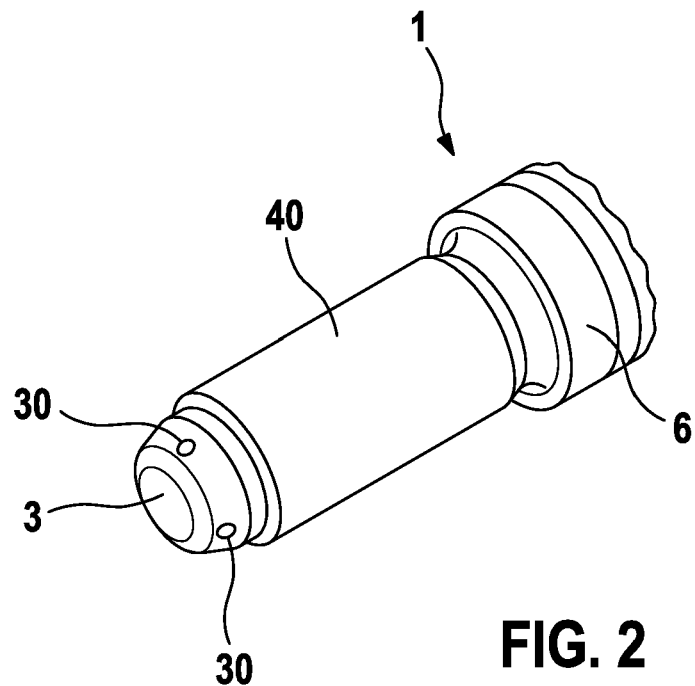
FIG. 2 shows a schematic, perspective partial view of the prechamber spark plug of FIG. 1, without an external thread.
Figure 3:
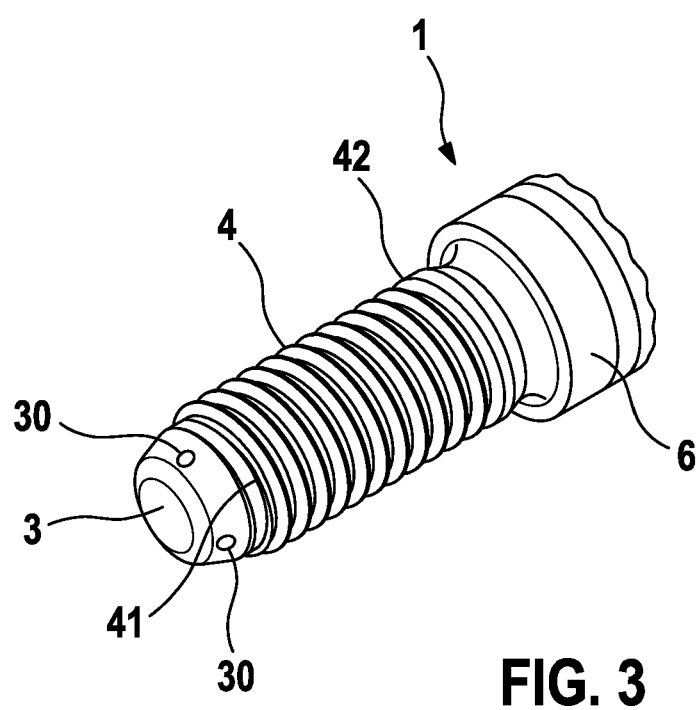
FIG. 3 shows a schematic, perspective partial view of the prechamber spark plug of FIG. 1, including an external thread.

A prechamber spark plug 1, which was manufactured according to one exemplary embodiment of the present invention, is described hereafter with reference to FIGS. 1 through 3.

As is shown in FIG. 1, prechamber spark plug 1 includes a prechamber 2, which is defined by a cap 3 having a U-shaped section. Cap 3 is fixed at a housing 6 of the prechamber spark plug, for example with the aid of a weld joint 9.

Prechamber spark plug 1 furthermore includes an electrode 5 and an insulator 7.

An external thread 4 is provided at the outer circumference of housing 6. External thread 4 is designed to adjoin cap 3 and is used to fix the prechamber spark plug in a cylinder head or the like.

Multiple through-holes 30 are provided in cap 3, which are each situated at an angle α with respect to a center axis X-X of prechamber spark plug 1. When an ignition takes place in prechamber 2 of prechamber spark plug, so-called torch jets are output through through-holes 30 into a combustion chamber of an internal combustion engine, which then ignite a mixture in the combustion chamber.

Since each internal combustion engine has different conditions with respect to a location of the prechamber spark plug in relation to an injection jet, a location of a fuel injector, a geometry of the combustion chamber and the like, prechamber spark plug 1 must, in each case, be individually situated at the combustion chamber of the internal combustion engine to ensure that the torch jets exiting through-holes 30 strike the mixture in the combustion chamber in an optimal manner. Furthermore, an optimal gas exchange must be carried out within prechamber 2 to ensure that an ignitable mixture is present in prechamber 2 itself again for a subsequent combustion cycle. It is thus essential that through-openings 30 are situated in the correct positions relative to the combustion chamber or to the fuel injector to optimally meet all conditions.

As a result, according to the present invention, an exact positioning of a start 42 and/or an end 41 of external thread 4 relative to through-openings 30 must be ensured. When start 42 and/or end 41 of external thread 4 is/are positioned correctly relative to through-openings 30 for the particular internal combustion engine, a consistent position of cap 3 with through-openings 30 with respect to the internal combustion engine may be ensured, for example, by specifying a predetermined tightening torque for the prechamber spark plug for fixing the prechamber spark plug in the cylinder head. As is apparent from FIGS. 2 and 3, initially a prechamber spark plug in which no external thread has been created yet is provided according to the method according to the present invention. FIG. 2 shows the state in which a circumferential surface 40, at which external thread 4 is later created, is shown as a cylindrical surface without thread.

Cap 3 may then be attached in an arbitrary position to this semi-finished prechamber spark plug without external thread. This may take place, for example, by welding cap 3 to the prechamber spark plug. In this way, through-openings 30 in cap 3 are still situated in an arbitrary alignment at the non-finished prechamber spark plug 1.

Thereafter, the prechamber spark plug is aligned based on through-openings 30 in the cap in such a way that a thread start 42 and/or a thread end 41 is present in a relative position with respect to at least one through-opening 30 for a last step of creating external thread 4. The start and/or end of external thread 4 is/are thus positioned relative to through-openings 30. In this way, it is possible at all times later, when prechamber spark plug 1 is screwed into internal combustion engine, to ensure a defined position of through-openings 30 at the combustion chamber of the internal combustion engine.

As a result, a predetermined orientation of through-openings 30 with respect to start and/or end 41 of external thread 4 is ensured.

FIGS. 4 and 5 show a prechamber spark plug which was manufactured according to a different method. As is apparent from FIG. 4, in the second exemplary embodiment, prechamber spark plug 1 is initially also provided without an external thread so that instead of the external thread, a cylindrical, smooth circumferential surface 40 is provided for the external thread. Thereafter, cap 3 is fixed in an arbitrary position at prechamber spark plug 1. In a next step, a disk 8 is pushed over the circumferential surface 40 until disk 8 rests against a protrusion 60. In this way, an angular position of through-openings 30 of cap 3 at the combustion chamber may be defined by a thickness D of disk 8. Thereafter, external thread 4 is created at prechamber spark plug 1, a thread start 42 and/or a thread end 41 again being positioned relative to through-openings 30 of cap 3.

It shall be noted that, as an alternative, a location of through-openings 30 may also be ascertained before external thread 4 is created, and an accordingly adapted thickness D of disk 8 may then be selected in connection with a predetermined thread pitch. Disk 8 is preferably a sealing disk. As a further alternative, a location of through-openings 30 and of the thread circumference may be ascertained in a device, and a suitable thickness D of disk 8 may be determined in connection with a thread pitch.

In the second exemplary embodiment, the sealing disk may thus fulfill two functions, namely, on the one hand, a sealing of the mounted prechamber spark plug at the cylinder head and, on the other hand, a defined positioning of through-openings 30 of cap 3.

FIGS. 6 and 7 show a prechamber spark plug which was manufactured according to yet another method. In this exemplary embodiment, a cap 3 without through-openings is mounted at prechamber spark plug 1. Thereafter, external thread 4 is created. In the last step, through-openings 30 are then introduced into cap 3, positioned in such a way that a relative position between through-openings 30 and start and/or end 41 of external thread 4 is adhered to in a predetermined manner.

As may be derived from the described exemplary embodiments, through-openings 30 of cap 3 may thus be positioned at a combustion chamber of an internal combustion engine in a directed manner, by which prechamber 2 is better flushed out, and an air-fuel mixture may be conducted better into the prechamber. Due to this improved flushing and filling of prechamber 2 with air-fuel mixture, it is possible for this mixture to be better ignited in the prechamber and to combust considerably more rapidly. Due to the more rapid combustion in the prechamber 2, torch jets, which find their way into the combustion chamber through through-openings 30, may then find their way sooner and deeper into the combustion chamber. In this way, the air-fuel mixture may be ignited more rapidly and more effectively in the combustion chamber itself, which ultimately results in a more rapid and more complete combustion in the combustion chamber of the internal combustion engine.

The method according to the present invention is applicable for all types of spark plugs including a prechamber and a cap.

What is claimed is:

1. A method for manufacturing a prechamber spark plug including an external thread and a cap having at least one through-opening, the method comprising the following steps:
   providing the prechamber spark plug without a cap and including a cylindrical circumferential surface for the external thread;
   mounting the cap, which has at least one through-opening, in an arbitrary alignment at the prechamber spark plug; and
   creating the external thread at the circumferential surface in such a way that a thread start and/or a thread end of the external thread is aligned in relation to the through-opening at a predetermined position.

2. The method as recited in claim 1, wherein the external thread is created using rolling or cutting.

3. The method as recited in claim 1, wherein a determination of the thread start and/or the thread end of the external thread is carried out using an optical method as a function of a position of the through-opening in the cap.

4. The method as recited in claim 1, wherein a disk having a predetermined thickness is situated at an outer circumference of the prechamber spark plug, adjoining the circumferential surface for the external thread, and then the external thread is created.

5. The method as recited in claim 4, wherein a thickness of the disk is determined as a function of a location of the through-opening of the cap.

6. The method as recited in claim 4, wherein the disk is a sealing disk.

7. The method as recited in claim 1, wherein a pitch of the external thread is determined based on an angle of the through-opening with respect to a center axis of the prechamber spark plug.

8. The method as recited in claim 1, wherein the prechamber spark plug includes at least two through-openings, and the thread start and/or the thread end of the external thread is positioned between the two through-openings in a circumferential direction.

\* \* \* \* \*